US008682478B2

(12) United States Patent
Kechel

(10) Patent No.: US 8,682,478 B2
(45) Date of Patent: Mar. 25, 2014

(54) METHOD AND APPARATUS FOR HANDLING A PLURALITY OF ARTICLES

(75) Inventor: Ottmar Kechel, Stockach (DE)

(73) Assignee: Siemens Aktiengesellschaft, Munich (DE)

( * ) Notice: Subject to any disclaimer, the term of this patent is extended or adjusted under 35 U.S.C. 154(b) by 268 days.

(21) Appl. No.: 13/213,764

(22) Filed: Aug. 19, 2011

(65) Prior Publication Data

US 2012/0046783 A1 Feb. 23, 2012

(30) Foreign Application Priority Data

Aug. 19, 2010 (DE) ........................ 10 2010 034 839

(51) Int. Cl.
*G06F 7/00* (2006.01)

(52) U.S. Cl.
USPC ........... 700/223; 700/214; 700/215; 700/224; 700/225; 700/226; 209/552

(58) Field of Classification Search
None
See application file for complete search history.

(56) References Cited

U.S. PATENT DOCUMENTS

| | | | |
|---|---|---|---|
| 5,097,960 | A | 3/1992 | Tilles et al. |
| 5,097,979 | A | 3/1992 | McDermott et al. |
| 5,158,183 | A | 10/1992 | Beerman et al. |
| 5,577,596 | A | 11/1996 | Van Essen |
| 5,799,800 | A | 9/1998 | Lux |
| 6,798,192 | B2 | 9/2004 | Faymon et al. |
| 7,405,375 | B2 | 7/2008 | Hanson |
| 7,777,148 | B2 | 8/2010 | Zimmermann |
| 2008/0011653 | A1 | 1/2008 | Stemmle |
| 2008/0087582 | A1 * | 4/2008 | Zimmermann ............... 209/552 |
| 2010/0332020 | A1 * | 12/2010 | Kechel .......................... 700/214 |

FOREIGN PATENT DOCUMENTS

| | | | |
|---|---|---|---|
| DE | 10 2004 056 696 | A1 | 6/2006 |
| DE | 10 2010 022 082 | A1 | 12/2010 |
| EP | 0 429 118 | A1 | 5/1991 |
| EP | 0 723 483 | B1 | 7/1996 |
| EP | 1 872 868 | A1 | 1/2008 |
| EP | 1 878 511 | A1 | 1/2008 |

OTHER PUBLICATIONS

German Patent and Trademark Office Search Report, Dated Apr. 8, 2011.

* cited by examiner

*Primary Examiner* — Yolanda Jones
(74) *Attorney, Agent, or Firm* — Laurence A. Greenberg; Werner H. Stemer; Ralph E. Locher

(57) ABSTRACT

A method and an apparatus handle a plurality of articles in an order, particularly flat mail items. This involves the use of an apparatus having a sorting installation, a temporary store and a handling position. Each temporary store has a feeder station and an outward transfer station. Each article passes through the sorting installation. The sorting installation measures what value a prescribed sorting feature assumes for the article. The article is fed into the temporary store. The article is either transported past the outward transfer station and remains on a conveyor track or it is transferred out of the temporary store and is transported to a handling position. The sorting installation sorts the articles and produces an order among the articles. The articles are transported to the feeder station which feeds the articles into the temporary store such that at any time all the articles are arranged in the order.

11 Claims, 7 Drawing Sheets

METHOD AND APPARATUS FOR HANDLING A PLURALITY OF ARTICLES

CROSS-REFERENCE TO RELATED APPLICATION

This application claims the priority, under 35 U.S.C. §119, of German application DE 10 2010 034 839.2, filed Aug. 19, 2010; the prior application is herewith incorporated by reference in its entirety.

BACKGROUND OF THE INVENTION

Field of the Invention

The invention relates to a method and an apparatus for handling a plurality of articles in an order, particularly flat mail items.

U.S. Pat. No. 6,978,192 B2 describes a sorting installation which sorts mail items in a single sorting pass ("single pass"). The sorting installation from FIG. 1 has a plurality of supply devices ("feeders 102") with readers ("OCR/bar code readers 107"). Each mail item is supplied to the sorting installation by a supply device 102, passes through a reader 107 and is transported to a supply transportation path ("outer transport system 104"). From the supply transportation path 104, a plurality of connecting transportation paths ("injection stations 107") branch off to a ring transportation path ("inner transport system 108"). The ring transportation path 108 is routed to a buffer ("buffer 114"). The ring transportation path 108 and the buffer 114 together form a closed transportation path. A sequence among the possible delivery points ("delivery points DP1, DP2, DP3") is prescribed. In the ring transportation path 108, an order among the mail items is produced on the basis of this order among delivery addresses. For this purpose, each mail item in the supply transportation path 104 is brought forward as far as a connecting transportation path 106 and is then transported to the ring transportation path 108 by the connecting transportation path 106. It is possible for the ring transportation path 108 not to have sufficient space available in order to correctly transfer in a mail item. In this case, the mail items are transported to the buffer 114 before the mail item which is to be transferred in. The buffer 114 feeds the mail items into the ring transportation path 108 again, so that a gap of sufficient size is produced.

U.S. Pat. No. 5,577,596 describes a sorting installation for mail items or the like. This sorting installation has four "input stations 1a, 1b, 1c, 1d" and many "output positions 3a, 3b", see FIG. 1. A connecting system connects the "input stations" to the "output positions" such that a mail item can be transported from any "input station" to any "output position". Each "input station" has a respective supply transportation path leaving it. Each "output position" has a respective leadaway transportation path routed to it. A plurality of connecting transportation paths connect each supply transportation path to each leadaway transportation path. These transportation paths are implemented by a multiplicity of "separate transport units 23". Each "transport unit 23" has a "disk-shaped support 25" and a "transport mechanism 27". Each "transport unit 23" can be rotated, so that differently positioned "transport units 23" can implement different transportation paths. In the embodiment from FIG. 1, the connecting system contains five parallel "tracks 103a, 103e", each with many "transport units 23". In the arrangement from FIG. 6, four "input positions 147a to 147d" are arranged in the center of a sorting installation and form a rectangle, and these four "input positions 147a to 147d" have "transport units 23" arranged between them in a hexagonal grid. To the left and right outside of this grid, there are two "wing portions 157, 159", each with two rows of "output positions 165a to 165d". The connecting system contains the grid with the "transport units" and two respective parallel "tracks 161, 163" to the two "wing portions 157, 159". FIG. 7 shows an alternative to the "transport unit 23", namely a "transport unit 167" with a "transport mechanism 169", which contains two continuous conveyor belts. The "transport unit 167" can be displaced from two "straight guides 173, 175" perpendicular to the transportation direction of the continuous conveyor belts. FIG. 8 shows an arrangement with two parallel "tracks 183a, 183b", between which there is a free "lane". In this "lane", a "track unit 167" can be displaced from the "track 183a" or "183b", with a "track unit 167b" entraining a mail item 185 from the "track 183a" and transferring it to a "transport unit 167g". This "transport unit 167g" entrains the mail item 185 to the other "track 183b".

Published, non-prosecuted German patent application DE 10 2004 056 696 A1 describes a sorting installation for mail items having three inputs E1, E2, E3 and three outputs A1, A2, A3. Three parallel transportation paths each connect an input to an output. Between these three transportation paths there are a plurality of connecting paths which branch off from a respective separating filter W1, W2, . . . and end up at a combination point Z11, . . . , Z21, . . . , KZ1, . . . , KZ4. Some combination points are in the form of junctions. As a result, any input can be connected to any output by at least two paths. This allows a mail item to be transported through a junction between a stream of mail items. If necessary, a gap of sufficient size is created.

Published, European patent application EP 1872868 A1 describes an arrangement with three sorting devices 1a, 1b, 1c for sorting mail items. Each sorting device has a supply device 2a, 2b, 2c, a transportation device 5a, 5b, 5c, a reader 6a, 6b, 6c and a sorting section 7a, 7b, 7c with a respective multiplicity of distribution devices 8a, 8b, 8c. Each sorting device 1a, 1b, 1c has a respective outward transfer device 9ab, 9ac, 9ba, . . . for each other sorting device, that is to say a total of 3×6 outward transfer devices in the example from FIG. 1. The mail items which a sorting device 1a transfer outs for another sorting device 1b are put in a container 10 in the output transfer device 9ab. The filled container 10 is transported by a transportation system 11 to an inward transfer apparatus 12a, 12b, 12c in the correct sorting device. The correct sorting device has a further reading device 13a, 13b, 13c for the mail items which have thus been transferred in.

Published, European patent EP 1878511 A1 describes a sorting installation having at least one "batch sorting module". A supply transportation device transports unsorted mail items to the "batch sorting module". A sequence of branch points is situated in the supply transportation device. Each branch point is routed to a store ("temporary batch storage 112"). Each store joins a leadaway transportation section. In each store, stacks of mail items are formed and the stacks are successively put into the leadaway transportation device and transported away by the latter. Two such sorting modules can be connected in series in the manner of a cascade in order to prompt sorting in two sorting passes. During the transportation, each mail item is held by a clamp.

Published, non-prosecuted German patent application DE 10 2010 022082 A1 describes a sorting installation for flat mail items. Each mail item to be sorted is transported along a supply transportation path to a connecting transportation path and is transported along this connecting transportation path to a leadaway transportation path. The leadaway transportation path contains a plurality of storage areas, with each storage area being formed between two respective junctions for two different connecting transportation paths. The mail items to be sorted are split over the storage areas on the basis of a computer-evaluatable sorting plan, specifically on the basis of measured values for a prescribed sorting feature. In one refinement, the supply transportation path, the leadaway transportation path and the connecting transportation paths form a closed track, see FIGS. 1 and 7.

European patent EP 0429118 B1 describes a sorting installation for flat articles, particularly for mail items. A supply transportation path ("main feed track 1") transports the mail items to a storage system having a multiplicity of stores ("buffers 20"). Arranged along the supply transportation path is a sequence of branch points. The stores are arranged in three parallel paths, for example, with four respective stores connected in series. Arranged along a leadaway transportation path is a sequence of junctions. The unsorted mail items are distributed over the stores and are transported away in sorted form by the leadaway transportation path.

U.S. Pat. No. 7,405,375 B2 describes a sorting installation having two transportation devices. The articles to be sorted, e.g. mail items, are held by holding elements, e.g. clamps. Each transportation device is able to transport these holding elements, specifically along a respective closed transportation track. Each holding element is first of all transported by the first transportation device ("first carriage 112a"), is then put into the second transportation device ("second carriage 112b") and is transported onward by the latter.

In the course of operation, the respective delivery address of each mail item is read. The mail item is put into a holding element. A sorting code is allocated firstly to each loaded holding element and secondly also to each free space in the second transportation device. The holding elements are put into the previously free spaces on the basis of these sorting codes. This produces an order among the articles. In this way, an order among loaded holding elements is produced in the second transportation device.

European patent EP 0723483 B1 describes a method and an apparatus for sorting articles using a plurality of collecting zones. The articles, e.g. items of clothing on clothes hangers, are first of all put into a collecting zone having a plurality of stagnation lines and from there are distributed over downstream collecting zones.

U.S. Pat. No. 5,097,979 describes a sorting installation having a singularizer, a transportation path and a plurality of storage areas. For each storage area, a respective separating filter is provided in the transportation path. The singularizer withdraws flat articles ("documents") from a stack. The transportation path transports a stream of flat articles. Each separating filter deflects flat articles into the associated storage area. This forms a respective stack of flat articles in each storage area.

U.S. Pat. No. 5,097,959 and U.S. Pat. No. 5,097,960 describe a method for describing mail items in a plurality of sorting passes ("multiple pass sorting"). In a first sorting pass, "document clusters 80" with mail items to be sorted are produced in "output holders 65". From such an "output holder 65", a "document cluster 80" is put into a "recirculation holder 150" with a "first end 155" and a "second end 160". This "recirculation holder 150" can be moved by "rails 170". A "document cluster 80" is put into an "input holder 47" for the next sorting pass, and the mail items in the "cluster 80" are singularized in said input holder. The next sorting pass is started. In succession, all further "document clusters 80" are put into the "input holder 47" and passed through a sorting installation in the next sorting pass. The method described allows the second sorting pass to begin immediately after the first "document cluster 80" has been put into the "input holder 47". The processes of putting the further "document clusters 80" into the "input holder 47" and performing the second sorting pass for the already supplied "document clusters 80" are carried out with an overlap in time.

SUMMARY OF THE INVENTION

The invention is based on the object of providing a method and an apparatus for handling a plurality of articles, in which the articles can arrive in a random arrangement and the articles are nevertheless prompted to reach at least one handling position in a manner organized on the basis of a prescribed sorting feature.

The method according to the solution and the apparatus according to the solution are configured to handle a plurality of articles.

Use is made of a sorting installation, at least one temporary store and at least one handling position.

Each temporary store contains a storage device having a closed conveyor track, at least one feeder station and at least one outward transfer station.

A sorting feature is prescribed.

Each temporary store is able to temporarily store a respective plurality of articles to be handled and to transport them along the closed conveyor track.

Each article passes through the sorting installation. Each article is then temporarily stored in a temporary store in the apparatus and is transported to a handling position in the apparatus.

Furthermore, the below described steps are performed for each article to be handled.

a. A measuring instrument in the sorting installation measures what value the prescribed sorting feature assumes for this article while the article passes through the sorting installation.

b. The article is transported to a feeder station for a temporary store in the apparatus.

c. The article is fed into this temporary store in the apparatus by this feeder station.

d. This temporary store transports the article on its closed conveyor track. This transportation on the closed conveyor track involves the article being transported at least once to an outward transfer station for this temporary store.

e. An outward transfer station removes the article from this temporary store again.

f. The article is transported to a handling position and is handled therein.

Whenever the article is in a temporary store and, when being transported along the closed conveyor track, is transported to an outward transfer station for this temporary store, one of the following two steps is performed: the article continues to be transported from the temporary store on the closed conveyor track and, in the course of this transportation, is transported past the outward transfer station, as a result of which this article remains in the conveyor track or the article is transferred out of the temporary store by means of the outward transfer station. The transferred-out article is then transported from the temporary store to a handling position in the apparatus.

When an article has been transferred out of a temporary store by an outward transfer station and has been transported to a handling position, the article is handled at this handling position.

The method also contains the now described steps.

a. The sorting installation sorts the articles to be handled on the basis of the prescribed sorting feature and uses the measured sorting feature values for sorting. The sorting on the basis of the sorting feature values produces at least one sorting order among the articles. In each sorting order, all articles for which the sorting feature assumes the same value are arranged in direct succession.

b. In the case of a single inward transfer station, a sorting order is produced. In the case of a plurality of inward transfer stations, a respective sorting order is produced for each feeder station. Each sorting order contains a plurality of sorted articles to be handled. Each article is part of a sorting order.

c. For each feeder station for each temporary store, a respective sorting order is produced. The articles in this sorting order are transported to the feeder station.

d. If a plurality of feeder stations are used, the articles to be handled which have been put into the sorting order are split over this plurality of feeder stations.

e. Each feeder station for each temporary store feeds each article transported to this feeder station into this temporary store. In this case, the process of feeding articles to be handled into a temporary store is carried out such that at any time all the articles in each temporary store are arranged in a respective storage order. Even in this storage order for the articles in the temporary store, all articles for which the sorting feature assumes the same value are arranged in direct succession.

The sorting order which the sorting installation produces by sorting among the articles has the following property: between two articles for which the sorting feature assumes the same value there is either no further article at all or exclusively further articles for which this sorting feature likewise assumes this matching value, that is to say the same value as for the first two articles. An order A-B-C-A among articles thus does not arise in the sorting order, wherein A, B and C are sorting feature values. The same applies to the storage order among the articles in the temporary store, which is produced by the feeding.

The method according to the solution allows rapid feeding of articles into a temporary store even when the temporary store always transports the articles in the same direction and preferably continuously on the closed conveyor track. Such transportation always in the same direction puts much less of a load on the temporary store and consumes significantly less energy than start and stop operation or transportation alternately in one direction and in the other. It is therefore advantageous to allow transportation of the articles in a temporary store always in the same direction. It is particularly advantageous if as few changes as possible are made to the transportation speed in the temporary store. The invention also allows transportation with only few or even no speed changes.

The storage order in the temporary store is produced by producing a sorting order before the feeding. It is not necessary to produce the storage order by moving articles in the temporary store in different directions or by virtue of a temporarily stored article overtaking another temporarily stored article.

This rapid feeding is achieved particularly by virtue of the temporary store having an upstream sorting installation and the sorting installation producing a sorting order among the articles before the articles reach the temporary store. The temporary store is not part of the sorting installation and does not need to be available for sorting, but rather only needs to be available for temporary storage. On the contrary, the sorting installation is upstream of each temporary store and produces the at least one sorting order before the articles reach the temporary store. The temporary store is thus reached by at least one sequence of articles which have been sorted on the basis of the sorting feature.

According to the solution, at least one respective sorting order for sorted articles reaches each feeder station. The feeder station feeds the first article in the sorting order into the temporary store, then the second article in the sorting order, and so on. The articles which are already in the temporary store before this feeding have also already been sorted on the basis of the sorting feature and form a storage order. No later than when an article in this storage order reaches this feeder station again for the first time after transportation via the entire closed conveyor track are all the articles in the sorting order fed into the temporary store, even during continuous operation and during transportation always in the same direction. The fact that the or each feeder station feeds sorted articles and a storage order is produced in the temporary store at any time reduces the time requirement for feeding significantly in comparison with the feeding of unsorted articles.

It is not necessary to provide a dedicated buffer for the feeding. In addition, it is not necessary to provide an overtaking point between the sorting installation and the temporary store.

Since the articles in a temporary store are arranged in a storage order and have therefore always been sorted on the basis of the sorting feature, it becomes possible for an outward transfer station to transfer out of the temporary store, in direct succession, all articles in the temporary store for which the sorting feature assumes the same prescribed value, or at least some of these articles, and for these articles to reach the same handling position in direct succession without the need to provide an overtaking point on the transportation section from the outward transfer station to the handling position. This effect often facilitates and speeds up the handling of the articles at the handling position in comparison with random and unorganized supply of articles.

The invention allows random access to and random removal of all those articles in the temporary store which have the same sorting feature value. These articles can be removed quickly without requiring a buffer for removal. Every single article in the temporary store can be accessed randomly. This random access is made possible without the need for various articles to be split over a plurality of temporary stores arranged in parallel. A plurality of parallel temporary stores inevitably require a plurality of transportation paths as the sorting installation according to the solution, and also branch points and merge points. In order to temporarily store the articles, no containers are required. This dispenses with the step of having to look for a temporarily stored article in a container.

The temporary store does not require an overtaking point or a crossing point and does not need to be designed to sort the same articles. The temporary store can therefore be of simple design. There is also no need for a crossing point or an overtaking point to be arranged between the sorting installation and the temporary store. This allows delay-free and crossing-free operation.

According to the solution, each storage device in the temporary store contains a respective closed conveyor track. It is possible for articles which are temporarily stored in a storage device to pass through the closed conveyor track in this storage device a plurality of times. This embodiment saves space and components in comparison with an embodiment in which an article passes through a conveyor track only once.

The apparatus can easily be adapted to suit different numbers of articles to be handled even in the event of different time periods before these articles are transferred out, namely by virtue of the transportation speed of the temporary store, the length of the closed conveyor track and/or the processing speed of the sorting installation being varied. It is possible, but not necessary, for the sorting installation or the at least one handling position to be adapted.

As a result of the temporary store, it is possible for the following processes during handling to be decoupled in time: the supply of articles to the apparatus according to the solution with the sorting installation and the at least one temporary store; and the handling of transferred-out articles at a respective handling position.

This temporal decoupling is particularly advantageous when the handling of articles at a handling position requires the collaboration of a human and it is necessary to decouple the supply of the articles from the working hours of this human. The sorting installation and each temporary store can, by contrast, be operated in fully automatic mode.

Since the sorting installation is upstream of the temporary store and the temporary store is not a functional component of the sorting installation, it is possible to decouple the step of supplying articles to the apparatus according to the solution from the step of the temporary store temporarily storing the articles. It becomes possible to supply the articles to be handled to the apparatus according to the solution either in a plurality of subsets or at once. In the first embodiment, the sorting installation sorts a respective subset.

As a result of the invention, the following processes can be decoupled from one another in time: the sorting of the articles by the sorting installation and the subsequent inward transfer of the sorted articles by the at least one feeder station; and the outward transfer of the sorted articles by the at least one discharge station and the subsequent transportation of the transferred-out articles to the at least one handling position.

This temporal decoupling utilizes the components of the apparatus according to the solution more evenly, increases throughput and avoids jams and waiting times.

As a result of the invention, the sorting installation and the temporary store can also be decoupled physically and, by way of example, set up in different rooms. The sorting installation produces a sorting order, and the sorted articles are transported from the sorting installation to the temporary store. It becomes possible for the sorting installation to be operated in a room such that in the event of a disturbance or for maintenance purposes, rapid access to a component of the sorting installation which needs to be examined is possible. The temporary store can be operated in a different room and usually requires manual access from the outside relatively rarely, because maintenance or repair is required relatively rarely. Each handling position can likewise be physically separated from the sorting installation and/or the temporary store. This physical separation allows better design of the existing space and allows the arrangement according to the solution to be adapted to suit existing rooms or physical circumstances.

Since the sorting installation is connected upstream of the temporary store, it is not necessary for articles to be sorted in advance or pre-sorted before these articles reach the sorting installation. On the contrary, the articles can reach the sorting installation in any order.

Preferably, a signal for an article stipulates whether an article to be handled in a temporary store is transferred out or remains in the temporary store when the article reaches an outward transfer station for this temporary store. By way of example, the article is transferred out when a signal is present and remains in the temporary store when this signal is absent. It is possible to prescribe a maximum reaction time for the apparatus according to the solution. Following the arrival of a signal for an article in the temporary store, no more than this reaction time must elapse before the article is transferred out of the temporary store. This maximum reaction time can be implemented as a result of the invention when only the transportation speed of the temporary store is sufficiently high—for a length of the conveyor track.

In one embodiment, a value order among the possible sorting feature values is stipulated and prescribed in advance. The sorting installation sorts the articles on the basis of this value order. The storage order among the articles in the temporary store also corresponds to this prescribed value order. The articles are fed into the temporary store accordingly. By way of example, the value order among the sorting feature values can be prescribed such that prescribed priorities or time constraints are observed for the handling of articles at a handling position. Furthermore, this embodiment allows a computer-evaluatable sorting plan to be prepared in advance and this to be prescribed for the sorting installation. This sorting plan allocates each of the possible sorting feature values at least one sorting endpoint in the sorting installation.

In another embodiment, the step of preparing an order among the possible sorting feature values in advance is saved. On the contrary, the sorting installation prepares this value order automatically, specifically among all the values of the sorting feature which have actually been measured at least once in the previous course of the sorting and are not only possible. In this case, a sorting feature value which is measured for the first time is inserted into the already produced value order among sorting feature values, e.g. at the close. The sorting installation sorts on the basis of this value order. The articles are fed into the temporary store such that the order among the articles in the temporary store always corresponds to the order produced.

The apparatus requires only a single feeder station rather than one feeder station per possible sorting feature value.

In one embodiment, the temporary store contains n feeder stations, where n>=2. These feeder stations preferably operate in parallel. The closed conveyor track of the temporary store passes each feeder station. A splitting device, which is arranged upstream of the feeder stations, splits the entire sorting order of sorted articles which leave the sorting installation over n individual sorting orders. Each individual sorting order is transported to the respective one feeder station. The parallel operation of the n feeder stations results in faster feeding into the temporary store than the use of just a single feeder station.

According to the solution, a respective sorting order per feeder station is produced. Each sorting order contains a respective plurality of articles to be handled. When there are a plurality of feeder stations, one embodiment involves the articles to be handled first of all being split such that a respective set of articles which have not yet been sorted is produced per feeder station. These sets reach the sorting installation in succession, and the sorting installation puts the articles in these sets into the sorting order for the feeder station. In another embodiment, the sorting installation produces a single overall sorting order with all the articles to be sorted. This overall sorting order is then split over a plurality of individual sorting orders, namely one sorting order per feeder station.

In one embodiment, a distinction is drawn between different article types of articles to be handled, e.g. using dimensions, weight, surface nature or other physical properties. For each article type, at least one respective feeder station is provided. The articles are split on the basis of the article types.

In one embodiment, a buffer is arranged between the at least one outward transfer station and the at least one handling position. Each article is transported to the buffer following outward transfer and is sent from the buffer to the at least one handling position. The buffer allows the following two processes to be decoupled in time: the outward transfer of an article from the temporary store; and the handling of the article at the handling position.

This embodiment is advantageous particularly when the handling requires the collaboration of a handler but the temporary store is operating fully automatically. In addition, this embodiment facilitates a continuous flow of articles to the at least one handling position, specifically regardless of the distribution of articles over the closed conveyor track of the temporary store.

Preferably, the articles in the buffer are also arranged in an order, namely a buffer order, at any time. This buffer order for the articles in the buffer is likewise dependent on the prescribed sorting feature. All articles for which the sorting feature assumes the same value are arranged in the buffer in direct succession. This embodiment allows the articles with matching sorting feature values to be transported to a handling position in direct succession. As a result, these articles can be handled at the handling position in direct succession, which is often more economical than mingled handling.

In one embodiment, the buffer likewise contains a closed conveyor track. The articles are always transported along this conveyor track in the same transportation direction.

In one embodiment, the temporary store contains a plurality of outward transfer stations. The closed conveyor track passes each outward transfer station. This embodiment allows parallel outward transfer.

In one embodiment, a subrange of the value range for the sorting feature is prescribed in advance or is produced when the value order is produced. By way of example, the value range produced contains every second actually measured sorting feature value. If the measured sorting feature value for an article falls into the prescribed or produced subrange of the value range, the article is transferred into the first temporary store, otherwise it is transferred into the second temporary store.

In one embodiment, two different types of temporary store ZwSp, ZwSp.1 are used. In the first temporary store, articles of a first article type are used, and the second temporary store is used to temporarily store other articles. A physical attribute and a subrange from the value range for this attribute are prescribed. By way of example, the attribute is a dimension or the weight. For each article, a measurement is performed to determine what value the physical attribute assumes for this article. If the attribute value for the article falls into the subrange, the article is of the first article type and is fed into the first temporary store. Otherwise, the article is fed into the second temporary store. This embodiment allows the first temporary store to be tailored to suit articles of the first article type and to be made particularly robust or particularly space-saving, for example.

A first article in the first temporary store and a second article in the second temporary store may have the same sorting feature value. Preferably, both articles are therefore put into a buffer in such a way that the two articles in the buffer are arranged in direct succession.

In one embodiment, an article is gripped permanently, while the following steps are performed: the article passes through the sorting installation; the article is transported to the temporary store and is fed into the temporary store; the article is transported along a closed conveyor track for a storage device in the temporary store; and the article is transferred out of the temporary store.

Preferably, the article is still gripped permanently even when the article is being transported from the temporary store to a handling position.

The embodiment with the permanent state of being gripped saves time and allows automatic handling at least until the article reaches a handling position. It is not necessary for the sorting installation to distribute the articles over different sorting endpoints, e.g. sorting compartments.

Preferably, the article is gripped permanently by virtue of the article being intermittently connected to a holding apparatus and being sorted on or into this holding apparatus, being temporarily stored and being transported to a handling position. By way of example, the holding apparatus is in the form of a storage pocket or in the form of a clamp arrangement. Preferably, each article is transported along the closed conveyor track of a storage device such that the greatest extent of the article connected to the holding apparatus is approximately perpendicular on the transportation direction of the conveyor track.

In one preferred embodiment, each article passes through the sorting installation twice, namely in a first sorting pass and in a subsequent second sorting pass. This embodiment allows the sorting order to be produced without having to count in advance how many articles each assume what sorting feature value and without having to temporarily store articles in the sorting installation in order to produce the sorting order. It is not necessary for there to be a temporary store or a sorting endpoint in the sorting installation for each sorting feature value, which is often unimplementable and requires a large amount of space.

Other features which are considered as characteristic for the invention are set forth in the appended claims.

Although the invention is illustrated and described herein as embodied in a method and apparatus for handling a plurality of articles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
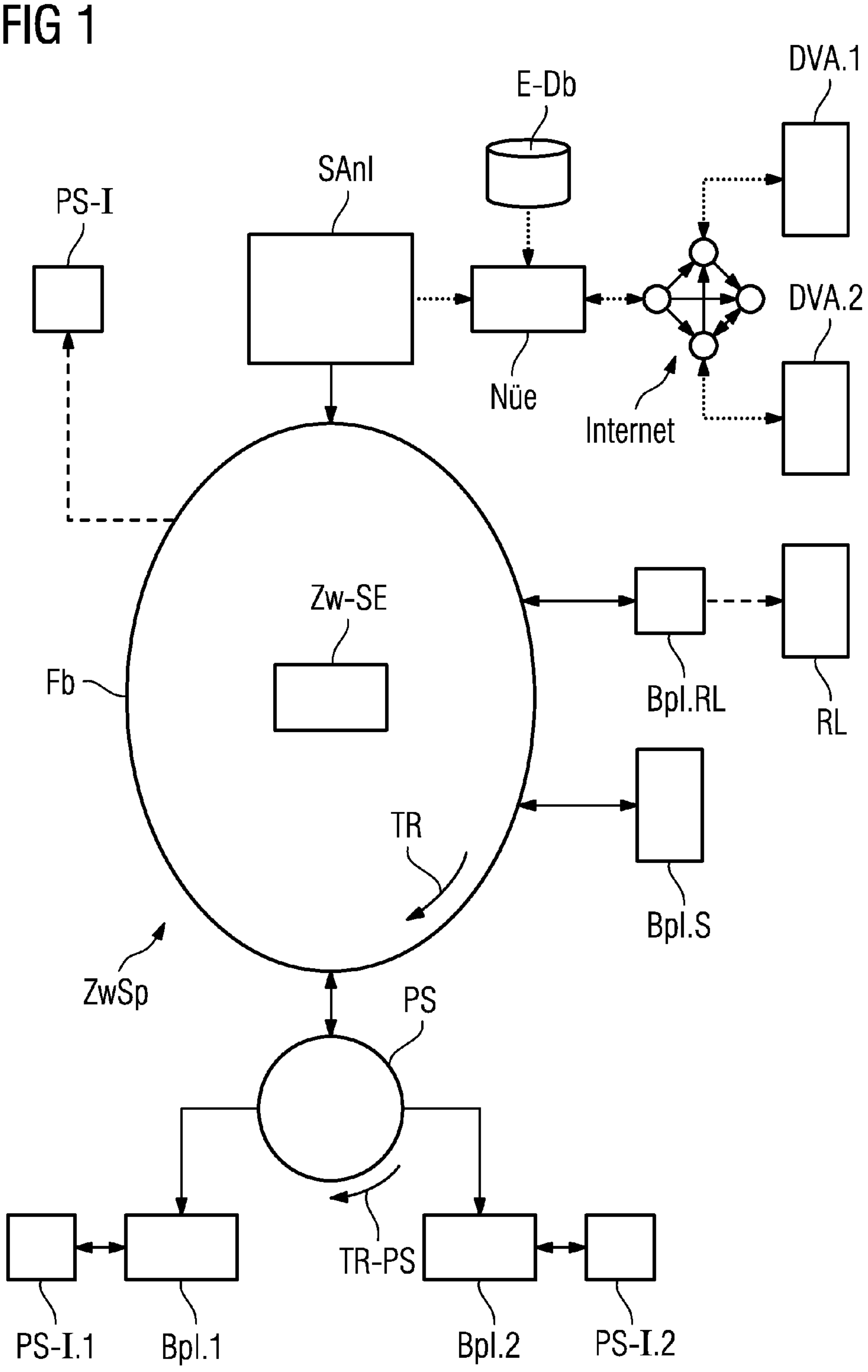
FIG. 1 is an illustration showing an overview of an arrangement of an exemplary embodiment according to the invention.

In the exemplary embodiment, the invention is used in order to process mail items (standard letters, large letters, postcards, catalogues and the like), with the mail items being addressed to registered recipients. Each mail item is provided with an identifier for a respective registered recipient. In the exemplary embodiment, these recipient identifiers act as possible values for a prescribed sorting feature.

A recipient database stores, for each registered recipient, a respective message address, preferably an e-mail address or another address for a data-processing appliance with a component for a message outward, and also a postal delivery address.

In the exemplary embodiment, the apparatus is used to implement the following execution:

a. A mail item for a registered recipient arrives on the apparatus according to the solution.
b. A computer-accessible image of a surface of the mail item is produced. The image shows the recipient identifier and usually details relating to the sender of the mail item.
c. The identifier of the registered recipient on the mail item is deciphered.
d. The message address of the recipient is ascertained, for which purpose the recipient database is searched. The message address of the recipient is sent a challenge message, preferably in the form of an e-mail. The challenge message contains the image with the identifiers of the recipient and, in one embodiment, additionally details relating to the sender, insofar as these can be ascertained by evaluating the image. In one embodiment, the challenge message contains further details relating to the mail item, e.g. the weight, at least one dimension and/or the time at which the image was produced.
e. The mail item is temporarily stored in a temporary store.
f. As soon as a response message arrives in response to the challenge message, the response message is evaluated in order to ascertain an action instruction from the recipient.
g. The mail item is removed from the temporary store.
h. An action with the removed mail item is performed at a handling position. The response message which has arrived specifies the action.
i. By way of example, one of the following actions is performed: send mail items unopened to the postal delivery address (“deliver”)—open mail item, produce at least one respective image of each object in the mail item and send the images to the recipient (“open and scan”)—archive mail item until the recipient has issued a new instruction (“store”)—securely destroy mail item (“save recycling”).

If the recipient has prescribed “open and scan”, the envelope of the mail item is opened and the objects in the envelope are removed. A respective image is produced for each removed object. Next, the envelope and the removed objects are put into a new envelope and the filled new envelope is put back into the temporary store. The images produced for the objects in the envelope and preferably the image of the envelope are transmitted to the registered recipient in electronic form, e.g. in the form of an email. The registered recipient is thus sent a further challenge message.

As soon as the recipient has sent a further response message for the filled new envelope with an instruction for the objects, the filled new envelope is removed from the temporary store again and is either sent or archived or destroyed.

In one embodiment, the apparatus according to the solution is used within a company in order to process all incoming mail items to employees of this company. Each employee of the company is a registered recipient. The apparatus according to the solution reduces the transportation of arriving mail items within the company substantially, namely to those mail items for which the respective recipient explicitly requires delivery in physical form.

In the exemplary embodiment, the apparatus according to the solution contains the following components:

a. a sorting installation having a supply device (“feeder”),
b. a reader and at least one loading station,
c. a multiplicity of holding apparatuses (“holders”) for a respective mail item,
d. a temporary store, preferably in the form of a storage ring,
e. at least one feeder station,
f. a telecommunication unit,
g. at least one handling position, preferably a plurality of handling positions,
h. at least one outward transfer station, and
i. preferably at least one buffer between the outward transfer station and the handling positions.

FIG. 1 schematically shows the configuration of the apparatus in the exemplary embodiment. The apparatus contains:

a. a sorting installation SAnl,
b. a telecommunication unit Nüe which is connected to the Internet,
c. a recipient database E-Db with information about registered recipients of mail items,
d. a temporary store ZwSp with a storage control unit Zw-SE,
e. a splitting device (separating filter W),
f. a buffer PS,
g. two handling positions Bpl.1, Bpl.2 for manual handling,
h. a handling position Bpl.S for automatic destruction (“shredder”),
i. a shelf store RL, and
j. a handling position Bpl.RL for the shelf store RL.

Figure 2:
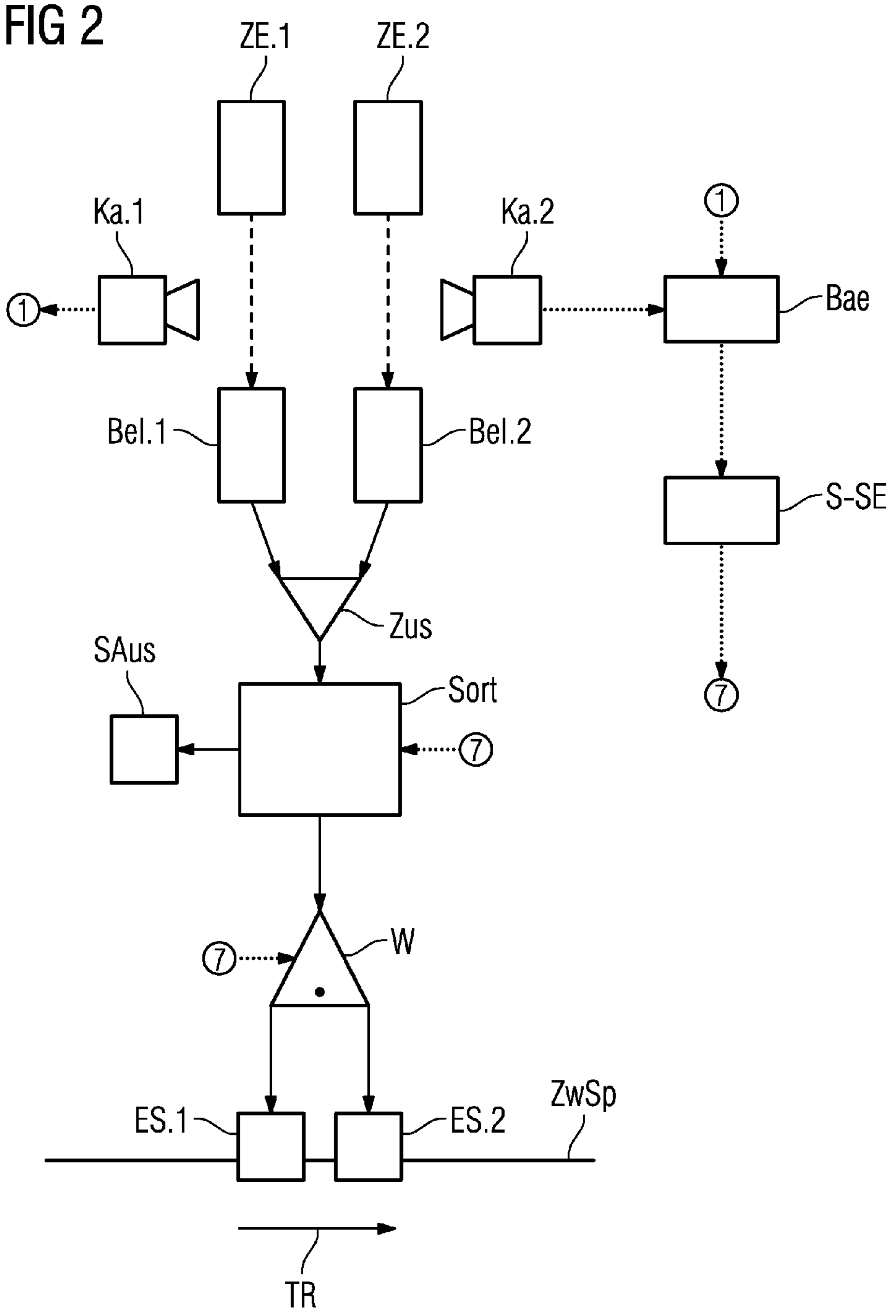
FIG. 2 is an illustration showing components of a sorting installation.

FIG. 2 schematically shows the components of the sorting installation Sanl. The sorting installation SAnl contains:

a. two supply devices (“feeders”) ZE.1, ZE.2 operating in parallel,
b. one loading station Bel.1, Bel.2 per supply device ZE.1, ZE.2,
c. a combination station Zus which combines the filled holding apparatuses from the two loading stations Bel.1, Bel.2,
d. two cameras Ka.1, Ka.2 and an image evaluation unit Bae,
e. the actual sorter Sort,
f. at least one sorting output Saus for mail items with undecipherable addresses and/or for the case of the sorter Sort overflowing,
g. a buffer PS-1 for empty holding apparatuses (“holders”), and
h. a sorting installation control device SSE.

Figure 3:
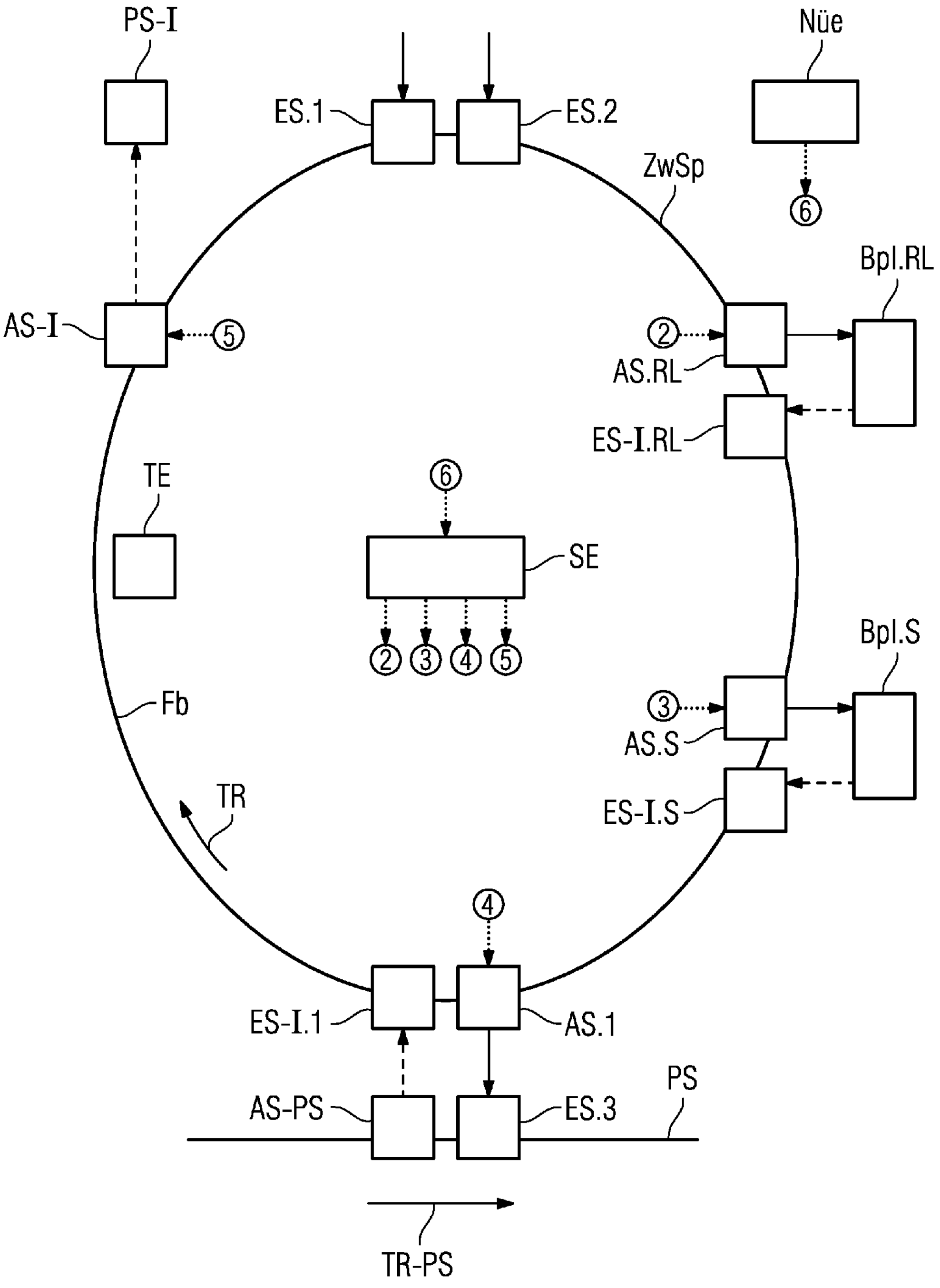
FIG. 3 is an illustration showing components of a temporary store.

FIG. 3 schematically shows the components of the temporary store ZwSp. The following components are arranged along the temporary store ZwSp:

a. two feeder stations ES.1, ES.2 which feed holding apparatuses with mail items into the temporary store ZwSp,
b. an outward transfer station AS.1 which transfers holding apparatuses with mail items out of the temporary store ZwSp, wherein the holding apparatuses with the mail items enter the buffer PS,
c. an outward transfer station AS.S which transfers holding apparatuses with mail items out of the temporary store ZwSp because the holding apparatuses with the mail items enter the handling position (“shredder”) Bpl.S,
d. an outward transfer station AS.RL for the shelf store RL,
e. four feeder stations ES-I.1, ES-I.RL, ES-I.2, ES-I.S which transfer empty holding apparatuses into the temporary store ZwSp, and
f. an outward transfer station AS-I which transfers empty holding apparatuses out of the temporary store ZwSp.

Figure 4:
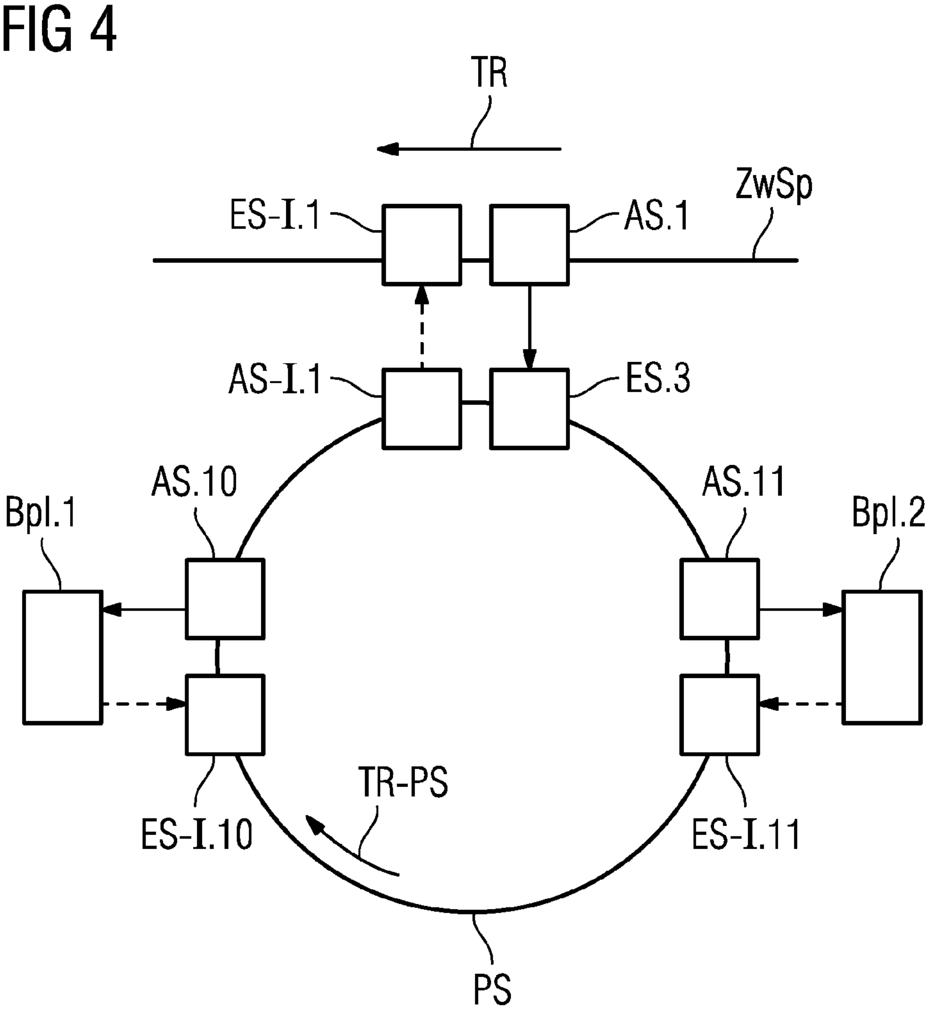
FIG. 4 is an illustration showing components of a buffer.

FIG. 4 schematically shows the components of the buffer PS. The following components are arranged along the buffer PS:

a. a feeder station ES.3 which transfers holding apparatuses with mail items into the buffer PS,
b. two outward transfer stations AS.10, AS.11 which transfer holding apparatuses with mail items out of the buffer PS,
c. two feeder stations ES-I.10, ES-I.11 which transfer empty holding apparatuses from a handling position BPI.1, BPI.2 into the buffer PS, and
d. an outward transfer station AS-I.1, AS-I.11 which transfers empty holding apparatuses out of the buffer PS.

The figures also show the transportation paths for holding apparatuses by means of solid arrows, and the transportation paths for mail items outside of holding apparatuses and also for empty holding apparatuses by means of dashed arrows. Paths for data transmission are shown by dotted instances of the arrows.

Within a prescribed delivery period, a set of mail items arrives at the sorting installation SAnl. Each of these mail items is provided with a respective identifier for a registered recipient. It is possible that in a preceding step the incoming mail items for registered recipients have been filtered out of the entire stream of incoming mail items and have been transported to the apparatus according to the solution in the exemplary embodiment.

This set of mail items is supplied to the sorting installation SAnl by means of the or a supply device ZE.1, ZE.2. Each supply device ("feeder") has a singularizer ("singulator") which singularizes the supplied mail items and produces a stream of upright mail items at a distance from one another. The stream of mail items is routed past the reader L and subsequently reaches a loading station Bel.1, Bel.2. In each loading station Bel.1, Bel.2, a respective mail item is successively connected to a holding apparatus.

The sorting installation SAnl performs the now described steps for each mail item in the set.

a. Each camera Ka.1, Ka.2 in the reader produces a computer-accessible image of the mail item which shows the recipient identifier.

b. An image evaluation unit Bae in the reader evaluates the images and thereby deciphers the recipient identifier on the arriving mail item.

c. A loading station Bel.1, Bel.2 in the sorting installation SAnl connects the mail item detachably to a previously empty holding apparatus ("holder"). The mail item remains connected to this holding apparatus until the holding apparatus with the mail item reaches a handling position.

The sorting installation SAnl activates the telecommunication unit Nüe. The telecommunication unit Nüe ascertains the message address of the recipient in the recipient database E-Db, produces the challenge message described above with the image of the envelope of the mail item and initiates the step that the challenge message is transmitted to the stored and ascertained message address of the registered recipient. The telecommunication unit Nüe is connected to a message network, e.g. to the Internet or to a company Intranet. This connects the telecommunication unit Nüe to data processing installations of registered recipients, e.g. to the two data processing installations DVA.2, DVA.2.

These steps are performed for each mail item.

FIG. 1 shows two data processing installations DVA.1, DVA.2 of registered recipients by way of example, both data processing installations DVA.1, DVA.2 being connected to the telecommunication unit Nüe by the Internet.

Furthermore, the now described steps are performed.

The sorting installation SAnl produces an order among the mail items in the set by virtue of the sorting installation SAnl putting the holding apparatuses with the mail items into this order.

In the example from FIG. 1, at least one stream of unsorted holding apparatuses with mail items reaches the actual sorter Sort. The sorter Sort puts the holding apparatuses for the mail items into an order, the order being dependent on the recipient identifiers on the mail items, that is to say on the sorting feature values of the articles that are to be handled.

In one embodiment, an order among the identifiers of registered recipients is prescribed. By way of example, this order is prescribed by an order of data records for registered recipients in the recipient database E-Db. This prescribed order among the possible identifiers of registered recipients stipulates the order which the sorting installation SAnl produces among the holding apparatuses with the mail items for registered recipients. The order among mail items for the same recipient (several articles with an identical sorting feature value) is stipulated, by way of example, by the respective time at which this mail item arrives, or is arbitrary. All mail items for the same registered recipient form a respective sequence in this order. Between two mail items for the same recipient there are, after sorting, no mail items for another registered recipient and also no mail items for any other recipient.

In a divergent embodiment, the sorting installation SAnl itself produces an order among the recipient identifiers. This order produced is an order among all those recipient identifiers (sorting feature values) which actually occur and which the reader Ka.1, Ka.2, Bae in the sorting installation SAnl has actually read and deciphered. Every time the reader Ka.1, Ka.2, Bae has deciphered a recipient identifier, the sorting installation SAnl checks whether this recipient identifier is already contained in the order produced. If not, the sorting installation SAnl adds this additional recipient identifier to the order produced to date, e.g. at the end or else at the beginning. The order produced contains suitable codings for the actually read recipient identifiers. The sorting installation SAnl sorts the mail items on the basis of this order produced. This is possible because each mail item is first of all transported past the cameras Ka.1, Ka.2 in the reader and only then is sorted. Hence, the recipient identifier on a mail item is first of all deciphered before the mail item reaches the actual sorter Sort.

The order which the sorting installation SAnl produces among the mail items corresponds to the prescribed order, or the order produced by the sorting installation SAnl itself, among sorting feature values. The order among the articles in the temporary store ZwSp also corresponds to the prescribed or produced order among the sorting feature values.

The mail items are first of all connected to a respective holding apparatus by a loading station Bel.1, Bel.2. Next, the holding apparatuses with mail items are sorted on the basis of the recipient identifiers on the mail items. The sorting installation SAnl initiates the step that a transportation device transports the sequence with the sorted holding apparatuses and the mail items to the feeder station or the feeder stations ES.1, ES.2. In the case of a plurality of feeder stations ES.1, ES.2, the order is split over a plurality of orders, and a respective order reaches each feeder station.

In the example from FIG. 2, the splitting device (separating filter W) splits the stream of sorted holding apparatuses with mail items which leaves the sorter Sort into two substreams. Each substream reaches a respective loading station Bel.1, Bel.2.

It is possible for the sorting installation SAnl to perform the following steps with an overlap in time, connecting mail items intermittently to a respective holding apparatus and putting holding apparatuses with mail items into an order.

The temporary store ZwSp has a transportation device TE for holding apparatuses and a closed conveyor track Fb which is in the form of an ellipse or a figure of eight, for example. Via this conveyor track Fb, the transportation device TE of the temporary store ZwSp moves holding apparatuses with mail items. The conveyor track Fb passes each feeder station and each outward transfer station of the temporary store ZwSp.

In the exemplary embodiment, at any time all mail items which are in the temporary store ZwSp at this time are arranged in an order. This order is in turn stipulated by the prescribed order among possible recipient identifiers. Between two mail items in the temporary store ZwSp for the same registered recipient there is at no time a mail item for another recipient. This order in the temporary store ZwSp is produced by appropriately feeding articles into the temporary store ZwSp. The feeder stations are the only source for articles in the temporary store ZwSp.

Each mail item is connected to a holding apparatus while the mail item is in the temporary store. The holding apparatus always remains the same for a mail item while the mail item is in the temporary store ZwSp.

The order which the sorting installation SAnl produces among the mail items corresponds to the prescribed order, or to the order produced by the sorting installation SAnl itself, among sorting feature values. The order among the articles in the temporary store ZwSp also corresponds to the prescribed or produced order among the sorting feature values.

In a transfer period, the temporary store ZwSp moves the holding apparatuses such that each holding apparatus is transported past each feeder station ES.1, ES.2 of the temporary store ZwSp within the transfer period. Each feeder station feeds the respective front most holding apparatus with a mail item into the temporary store ZwSp, so that the holding apparatus for the mail item is on the conveyor track Fb. Both the mail items in the temporary store ZwSp and the mail items in each feeder station ES.1, ES.2 are put into an order which is stipulated by the order among the recipient identifiers. On account of these orders, it is sufficient to transport each holding apparatus past each feeder station ES.1, ES.2 once in the transfer period. As a result, any gap between two successive holding apparatuses is also transported past each feeder station ES.1, ES.2, and a further holding apparatus with a mail item can be fed into the gap.

Each feeder station ES.1, ES.2 thus performs "merging" of two already sorted streams of mail items, so that downstream of the feeder station ES.1, ES.2 there is a single stream of sorted mail items.

It is possible for the sequence of holding apparatuses with mail items which leaves the sorting installation to be split over n sequences, where n the number of feeder stations. By way of example, every n-th holding apparatus is transported to the same feeder station. This allows the n feeder stations to operate in parallel.

In the example from FIG. 2, the splitting device W splits the sequence of holding apparatuses with mail items over n=2 streams. The two input transfer stations ES.1, ES.2 operate in parallel.

The temporary store ZwSp is preferably configured to enlarge a gap between two holding apparatuses with mail items which are in the temporary store ZwSp on the conveyor track Fb if this gap reaches a feeder station ES.1, ES.2 and is not sufficient to take in holding apparatuses with mail items which are supplied by the sorting installation SAnl. The gap can be enlarged as much as is necessary in order to feed in additional holding apparatuses. By way of example, the subsequent holding apparatus, which is already in the temporary store ZwSp, is intermittently stopped or at least slowed down.

When the transfer period has elapsed, all mail items in the set have been put into the temporary store ZwSp. At any time, the temporary store ZwSp contains the holding apparatuses with mail items in an order, wherein the holding apparatuses with the mail items have been sorted on the basis of the prescribed or produced order among the recipient identifiers. The sorting installation SAnl is now able to sort a further set of mail items. The feeder station or the feeder stations ES.1, ES.2 then allow this further set to be fed into the temporary store ZwSp in turn, so that again the prescribed or produced order among the recipient identifiers is retained.

The telecommunication unit Nüe evaluates incoming response messages from registered recipients. Each incoming response message relates to a mail item and stipulates which of the possible actions needs to be performed with this mail item. The response messages arrive on the telecommunication unit Nüe in an unpredictable and uncontrollable order and at unpredictable times.

In the example in FIG. 1, the telecommunication unit Nüe evaluates, inter alia, response messages which come from the data processing installations DVA.1, DVA.2. The telecommunication unit Nüe evaluates these response messages and produces signals for the storage control unit Zw-SE. The storage control unit Zw-SE actuates the outward transfer stations AS.1, AS.S of the temporary store ZwSp.

The conveyor track Fb of the temporary store ZwSp also passes each outward transfer station AS.1, AS.S, AS.RL.

Preferably, the transportation device TE of the temporary store ZwSp moves the holding apparatuses such that each holding apparatus is moved via the conveyor track Fb until the holding apparatus with the mail item is transferred out in order to perform the action with the mail item which the recipient has specified. Each holding apparatus is therefore routed past each outward transfer station AS.1, AS.S, AS.RL at least once, usually more than once.

In one embodiment, at least one respective specialized handling position is prescribed for every possible action which a registered recipient can prescribe for a mail item. Each handling position is designed to perform at least one possible action with a mail item. Each outward transfer station is connected to at least one handling position by means of a transportation path.

In the example from FIG. 1, two handling positions Bpl.1, Bpl.2 are used which are both configured for the two actions "open and scan" and "deliver". Therefore, each handling position Bpl.1, Bpl.2 has an opener for envelopes, a scanner for objects in an open envelope and an enveloping machine. A further handling position Bpl.S ("shredder") destroys arriving mail items fully automatically. In a further handling position Bpl.RL, mail items are put into containers.

As soon as a holding apparatus with a mail item has reached an outward transfer station AS.1, AS.S, AS.RL, the now described steps are performed.

a. A check is performed to determine whether this mail item now has a response message available with a statement from the recipient prescribing what action needs to be performed with this mail item. Such a response message may have been transmitted from the storage control unit Zw-SE to the outward transfer station AS.1, AS.S, AS.RL.

b. If there is a response message available with a prescribed action for this mail item and if the prescribed action for this mail item is an action which can be performed at that handling position which is connected to the outward transfer station, the outward transfer station transfers the holding apparatus with the mail item out of the temporary store ZwSp. The holding apparatus with the mail item is transported to the handling position.

c. If the mail item has no available statement prescribing an action or no available statement prescribing a suitable action, the holding apparatus with the mail item is transported past the outward transfer station and remains in the temporary store ZwSp.

The or each handling position Bp.1, Bpl.2, Bpl.S is reached by a sequence of holding apparatuses with mail items. The prescribed or produced order among the recipient identifiers also stipulates this sequence with holding apparatuses because the holding apparatuses reach the outward transfer station AS.1, AS.S, AS.RL in the order and single holding apparatuses are transferred out of this sequence and the remaining holding apparatuses remain in the temporary store ZwSp.

In one embodiment, each outward transfer station AS.1, AS.S, AS.RL is connected directly to a handling position. There are then at least as many outward transfer stations as handling positions.

In one modification, each transportation path between an outward transfer station AS.1 and a manual handling position Bpl.1, Bpl.2 contains a buffer PS. The transferred-out sequence of holding apparatuses with mail items is fed into this buffer PS. At a later time, this sequence of holding apparatuses with mail items is removed from the buffer PS and is transported to the handling position Bpl.1, Bpl.2. The order among the holding apparatuses in the buffer PS is the same as the sequence or the same as the inverse sequence among the recipient identifiers.

Both embodiments ensure that all transferred-out mail items for a first recipient in a sequence reach the handling position Bpl.1, Bpl.2, Bpl.S first, then all the transferred-out mail items for a second recipient, and so on, without transferred-out mail items for different recipients being mingled. This embodiment particularly allows a single new mail item to be produced with a plurality of original mail items which are addressed to the same recipient, and to be transported to this recipient.

In a second modification, a buffer PS is connected to a plurality of outward transfer stations and/or to a plurality of handling positions Bpl.1, Bpl.2. In this case too, the holding apparatuses for the mail items are temporarily stored in the buffer PS such that the sequence is maintained. The buffer PS distributes the holding apparatuses with mail items over the specialized handling positions Bpl.1, Bpl.2 on the basis of the prescribed actions to be performed.

FIG. 4 shows an embodiment in which the buffer PS is connected to the two manual handling positions Bpl.1, Bpl.2 and to the outward transfer stations AS.1, AS.S. The buffer PS has an inward transfer station ES.3, two further feeder stations ES-I.10, ES-I.11, two outward transfer stations AS.10, AS.11 and two further outward transfer stations AS-I.10, AS-I.11. The holding apparatuses with mail items which have been transferred out of the temporary store ZwSp by the outward transfer station AS.1 likewise arrive at the feeder station ES.3. The holding apparatuses with mail items which have been transferred out of the temporary store ZwSp by the outward transfer station AS.S arrive at the feeder station ES.3. The feeder station ES.3 feeds the holding apparatuses to be transported with mail items into the buffer PS. The outward transfer stations AS.10 and AS.11 transfer holding apparatuses with mail items out of the buffer PS. Those holding apparatuses with mail items which are transferred out by the outward transfer station AS.10 arrive at the handling position Bpl.1. Those holding apparatuses with mail items which are transferred out by the outward transfer station AS.11 arrive at the handling position Bpl.2.

At each handling position Bpl.1, Bpl.2, Bpl.S, Bpl.RL, the now described steps are performed for each mail item which reaches the handling position together with a holding apparatus.

a. The mail item is separated by the holding apparatus.

b. The process of temporarily storing the empty holding apparatus at the handling position Bpl.1, Bpl.2, Bpl.S, Bpl.RL or transporting it back to the sorting installation SAnl is initiated.

c. That action with the mail item is performed which the recipient specified for this mail item.

A return transportation path is routed from the handling position Bpl.1 to the feeder station ES-I.10, and a return transportation path is routed from the handling position Bpl.2 to the feeder station ES-I.11. The two feeder stations ES-1.10, ES-I.11 first transfer empty holding apparatuses from the handling positions Bpl.1, Bpl.2 into the buffer PS again. Second, the two feeder stations ES-I.10, ES-1.11 transfer holding apparatuses with mail items back into the buffer PS. These mail items are then produced at the handling position Bpl.1, Bpl.2 when a registered recipient has prescribed the action "open and scan" and when, as described above, the original envelope and the objects in an original envelope are put into a new envelope at the handling position Bpl.1, Bpl.2. This new, now filled envelope acts as a mail item which is transferred back into the buffer PS after having been connected to a holding apparatus.

It has already been explained that new mail items are produced at each manual handling position Bpl.1, Bpl.2, namely every time a recipient has prescribed "open and scan". The feeder stations ES-I.1, ES-I.2 are used to feed these new mail items and empty holding apparatuses into the buffer PS. The buffer PS routes the holding apparatuses with the new mail items and the empty holding apparatuses past two outward transfer stations AS.10, AS.11 operating in parallel. These outward transfer stations AS.10, AS.11 transfer holding apparatuses with new mail items and empty holding apparatuses out of the buffer PS. The transferred-out holding apparatuses are transported to the two inward transfer stations ES-I.1, ES-I.2. The two inward transfer stations ES-I.1, ES-I.2 transfer the holding apparatuses back into the temporary store ZwSp. In this case, the prescribed or produced order among sorting feature values (recipient identifiers) is again considered when a holding apparatus with a new mail item is fed into the temporary store ZwSp. Empty holding apparatuses are transferred into free gaps on the conveyor track Fb as desired.

The handling position Bpl.S ("shredder") destroys the arriving mail items fully automatically. A transportation path is routed from the outward transfer station AS.S to the handling position Bpl.S. At the handling position Bpl.S, the mail items to be destroyed are separated from their respective holding apparatuses. The now empty holding apparatuses are transported to the feeder station ES-I.S. The feeder station ES-I.S feeds empty holding apparatuses into the temporary store ZwSp.

As already explained, each mail item in a loading station Bel.1, Bel.2 is connected to a holding apparatus, and the holding apparatus together with the mail item is transported to a handling position Bpl.1, Bpl.2, Bpl.S. There, the mail item is separated from the holding apparatus again. As a result, the holding apparatus becomes free and can be used to transport a further mail item again. A freed holding apparatus can be used at the same handling position as that at which it became free in order to connect a mail item produced at this handling position to the holding apparatus, namely when the recipient has prescribed "open and scan". Usually, more holding apparatuses become free at a handling position than are required at this handling position, however. The handling position Bpl.1 therefore has a buffer PS-1.1 for free holding apparatuses. The handling position Bpl.2 has a buffer PS-1.2 for free holding apparatuses. The holding apparatuses which become free at the handling position Bpl.S are immediately transported back and do not remain at this handling position Bpl.S. Handling positions Bpl.1, Bpl.2 also transport back free holding apparatuses, specifically as far as the buffer PS-1 for empty holding apparatuses.

A holding apparatus which becomes free at the handling positions Bpl.1 or Bpl.2 is transferred into the buffer PS, specifically by the feeder station ES-1.10 or ES-I.11. Empty holding apparatuses are transferred in suitable gaps between holding apparatuses with mail items in the buffer PS as desired. The outward transfer stations AS-I.10 and AS-I.11 transfer empty holding apparatuses out of the buffer PS. An empty holding apparatus which has been transferred out by the outward transfer station AS-I.10 is transported to the feeder station ES-I.1. An empty holding apparatus which has been transferred out by the outward transfer station AS-I.11 is transported to the feeder station ES-I.2. The feeder stations ES-I.1 and ES-I.2 feed empty holding apparatuses into the temporary store ZwSp. A holding apparatus which becomes free at the handling position Bpl.S ("shredder") arrives at the feeder station ES-I.S and is fed into the temporary store ZwSp by the latter. Each feeder station ES-I.1, ES-I.2, ES-I.S feeds empty holding apparatuses into suitable gaps in the temporary store ZwSp. The outward transfer station AS-1 transfers empty holding apparatuses out of the temporary store ZwSp, and from the outward transfer station AS-I the empty holding apparatuses are transported to the buffer PS-I and a temporarily stored therein. If required, an empty holding apparatus is transported from the buffer PS-I to a loading station Bel.1, Bel.2.

Preferably, a maximum retention period is prescribed. Measurement and storage area performed when a mail item together with the holding apparatus has reached the temporary store ZwSp. When the residence time of the mail item in the temporary store ZwSp has reached the prescribed maximum retention period, the holding apparatus with this mail item is transferred to an outward transfer station and is transferred out of the temporary store by this outward transfer station. The mail item is separated from the holding apparatus and is subjected to predefined standard treatment. The empty holding apparatus is transported back to the sorting installation SAnl.

In one embodiment, a maximum intake capacity for the temporary store ZwSp is prescribed, e.g. as a maximum number of holding apparatuses which the temporary store can take in. As soon as the storage capacity has been reached, single holding apparatuses with mail items are transferred out when there are no actions to be performed for these mail items. By way of example, the holding apparatus with that mail item which has been in the temporary store ZwSp longest is removed. In turn, the mail item is separated from the holding apparatus and a standard treatment with the mail item is performed.

In one embodiment, for each registered recipient, it is automatically counted how many mail items for this recipient are currently in the temporary store ZwSp. These numbers are stored and provide the total numbers of mail items in the temporary store ZwSp. If a prescribed criterion has been met, all mail items to the same recipient are transferred out of the temporary store ZwSp and put into a static store. These mail items for the same recipient are in the temporary store ZwSp in direct succession prior to being transferred out. Preferably, the mail items remain on their respective holding apparatuses. This static store is a container, for example, and the filled container is put into a shelf store RL for containers or else is put into a handling position.

By way of example, the prescribed criterion is met if the total number of mail items in the temporary store ZwSp has reached a prescribed limit and therefore there is no longer any free space in the temporary store or all mail items for the recipient—or a particular number of mail items for the recipient—have been resident in the temporary store for longer than a minimum residence time without there being a response message from the recipient.

The temporary store ZwSp has an additional outward transfer station AS.RL. A holding apparatus with mail items which is transferred out by this outward transfer station AS.RL arrives at a handling position Bpl.RL for the shelf store RL. The mail item is separated from the holding apparatus at the handling position Bpl.RL and is put into a container. The container is entered by a plurality of mail items. The filled container is put into the shelf store RL. The now empty holding apparatus is transported to the feeder station ES.RL and is transferred into the temporary store ZwSp again by the latter. The empty holding apparatus is transported to the buffer PS-I.

In the embodiment described hitherto, a single temporary store ZwSp is used. In a plurality of modifications, at least two temporary stores ZwSp, ZwSp.1 are used in each case. In each of these modifications too, the holding apparatuses with mail items are transferred into each temporary store such that the order among the holding apparatuses with mail items in each temporary store corresponds to the prescribed or produced order among the recipient identifiers. In all three modifications, all temporary stores are connected to the same buffer PS.

Figure 5:
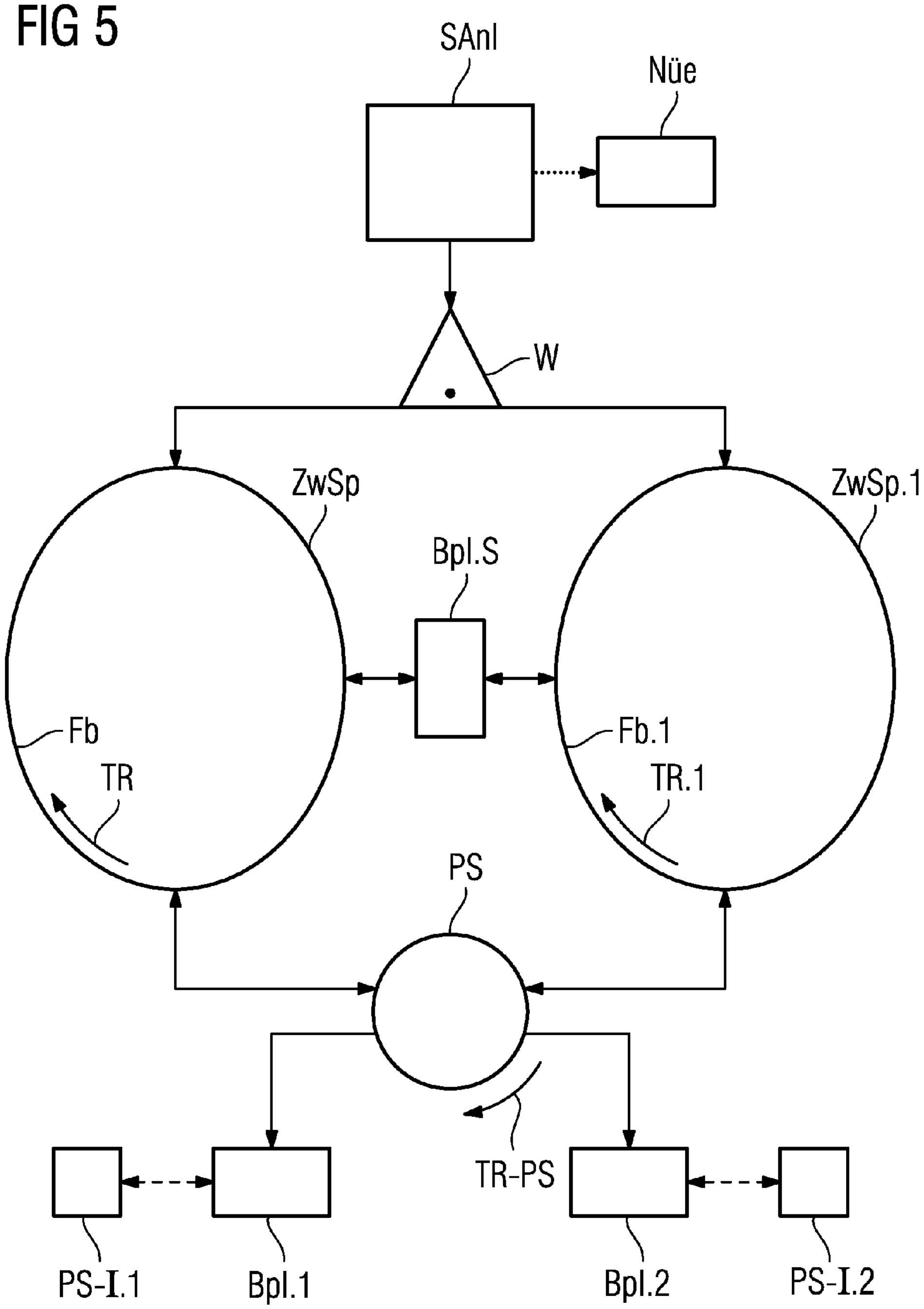
FIG. 5 is an illustration showing a modified arrangement having two temporary stores.

FIG. 5 shows an embodiment with two temporary stores ZwSp, ZwSp.1. Both temporary stores ZwSp, ZwSp.1 are connected to the same buffer PS.

In the first modification, an overflow temporary store is used in addition to the actual temporary store ZwSp. A holding apparatus with a mail item is transferred into the overflow temporary store only if the temporary store ZwSp is completely full.

In the second modification, two temporary stores ZwSp, ZwSp.1 of the same kind are used, and the possible or else actual recipient identifiers are split over two identifier sets. By way of example, a prescribed order among the possible recipient identifiers is divided into two suborders, which provides two sets. Alternatively, the sorting installation produces an order among actually occurring recipient identifiers (sorting feature values) as described above and splits this order into two sets. By way of example, the first, third, fifth etc. measured recipient identifiers go into the first identifier set and the second, fourth, sixth etc. recipient identifiers go into the second identifier set. A holding apparatus with a mail item is then fed into the first temporary store ZwSp if the recipient identifier on the mail item is part of a first identifier set, and otherwise it is fed into the second temporary store.

In the third embodiment, two different temporary stores ZwSp, ZwSp.1 are used. By way of example, the first temporary store ZwSp is able to take in a large number of standard letters in space-saving fashion and requires only relatively simple holding apparatuses. The second temporary store ZwSp is able to take in large letters (in the USA: "flats") in addition to the standard letters and has complicated holding apparatuses which are also able to take in these relatively large letters.

In this modification, the sorting installation measures the dimension and/or the weight of each mail item. A holding apparatus with a mail item is then transferred into the first temporary store ZwSp if the measured physical attribute falls in a prescribed subrange of the value range for this attribute, and otherwise is transferred into the second temporary store ZwSp.

In this third modification, the case may arise that two mail items for the same recipient are in different temporary stores ZwSp, ZwSp.1. The holding apparatuses for these two mail items are therefore preferably transferred into the same buffer PS such that the mail items are in the buffer PS in direct succession.

The text below describes possible physical implementations of components of the apparatus according to the solution.

In one embodiment, each holding apparatus ("holder") has the form of a storage pocket. Each storage pocket has a filling opening and a removal opening. These two openings may match. The removal opening is preferably sealable. The filling opening may also be sealable. The filling opening can be used to insert a mail item into the storage pocket and, as a result, to intermittently connect it to the holding apparatus in the form of the storage pocket. A mail item can be removed from the storage pocket through the removal opening. By way of example, a mail item slides from the top through the filling opening into the storage pocket. A horizontal linear movement allows the mail item to be removed from the storage pocket again. It is also possible for the removal opening to be at the bottom of the storage pocket and to be sealed by a flap. A lever can be used to open this flap.

In another embodiment, each holding apparatus ("holder") contains at least two clamps. The at least two clamps grip a mail item such that the mail item—in a similar manner to an item of laundry—is suspended by the clamps. When the clamps are opened, the mail item slides downward.

It is also possible for the holding apparatus to hold the mail item in the way in which a sleeve with a clamp holds an employee ID in the form of a check card.

If flat mail items are being processed, each mail item extends in an article plane. Preferably, the holding apparatuses with the flat mail items are transported such that the article planes of the transported mail items are at an angle of greater than 30° on the transportation direction. Preferably, the article planes are perpendicular on the transportation direction.

For each mail item to a registered recipient, the sorting installation SAnl produces an explicit mail item identification. This explicit mail item identification distinguishes the mail item from any other mail item which reaches the sorting installation within a prescribed period. Preferably, a machine-readable coding for the explicit mail item identification is applied to the mail item, for example by printing a label with a bar pattern which encodes the explicit mail item identification and sticking the printed label on the mail item. The explicit mail item identification is sent as a component of the challenge message and is used to associate an incoming response message with the correct mail item. Each response message therefore contains an explicit identification for a mail item.

Preferably, each holding apparatus is furthermore provided with a coding for an explicit holding apparatus identification. The holding apparatus identification distinguishes the holding apparatus from all other holding apparatuses in the arrangement according to the solution. The sorting installation SAnl and also each feeder station ES.1, ES.2 and each outward transfer station AS.1, AS.S each have at least one reader for holding apparatus identifications. The information regarding which mail item (with which explicit mail item identification) has been connected to which holding apparatus (with which holding apparatus identification) is stored. This embodiment means that the apparatus "knows" at all times where which mail item is currently located.

If the mail item is separated from the holding apparatus again, the information is deleted again.

Each temporary store ZwSp contains a closed conveyor track Fb and a drive which is able to move holding apparatuses with mail items and empty holding apparatuses along the conveyor track Fb. Preferably, the drive always moves the holding apparatuses in the same transportation direction TR, specifically continuously or in a start-stop mode. By way of example, the temporary store ZwSp has a continuous chain or a continuous conveyor belt or a continuous rail. During feeding, a holding apparatus is suspended in this continuous chain, connected to the continuous conveyor belt or guided along the continuous rail. The article plane at the mail items is in this case preferably perpendicular on the respective transportation direction TR.

The buffer PS is preferably of similar design to the temporary store ZwSp and likewise transports holding apparatuses with mail items along a closed conveyor track in a transportation direction TR-PS. However, the conveyor track of the buffer PS is shorter than the conveyor track Fb of the temporary store ZwSp, which means that the buffer PS is able to take in fewer mail items than the temporary store ZwSp. The buffer PS can also operate on the basis of the "last-in/first-out principle" and may have a stack store for holding apparatuses.

Figure 6:
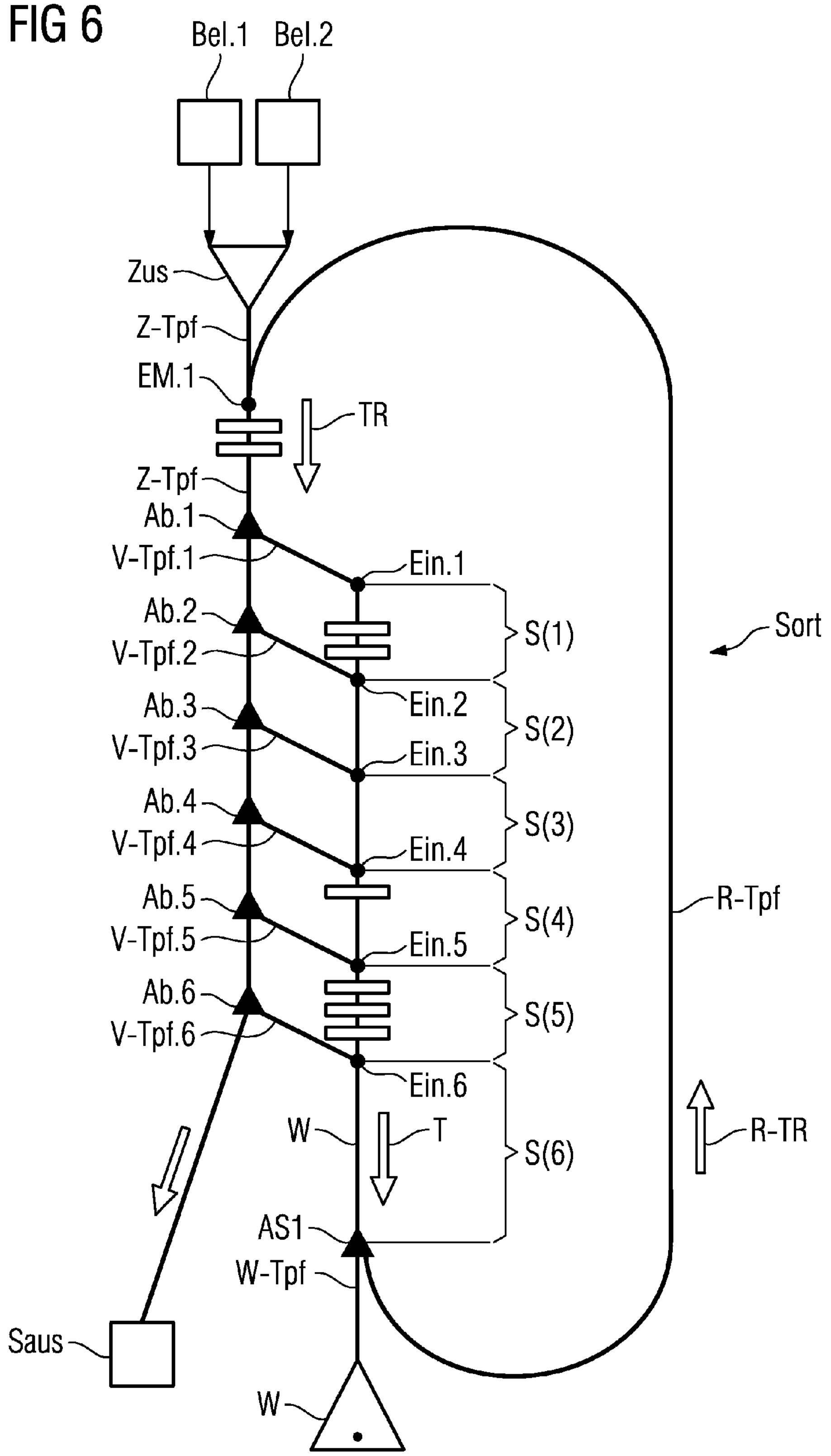
FIG. 6 is an illustration showing an exemplary sorter.

In one preferred embodiment, which is shown in FIG. 6, the sorter contains:

a. a supply transportation path Z-Tpf,
b. a leadaway transportation path W-Tpf,
c. a return transportation path R-Tpf, and
d. a multiplicity of connecting paths V-Tpf.1, V-Tpf.2, . . .

In the example from FIG. 6, the supply transportation path Z-Tpf transports mail items in the transportation direction TR-Sort. The return transportation path R-Tpf transports mail items in the return transportation direction R-TR-Sort.

Each connecting path V-Tpf.i branches off from the supply transportation path Z-Tpf at a branch point Ab.i and joins the leadaway transportation path W-Tpf at a junction Ein.i (i=1, 2, . . . ). The branch points Ab.1, Ab.2, . . . are arranged in the supply transportation path Z-Tpf in an order, and the junctions Ein.1, Ein.2, . . . are arranged in the leadaway transportation path W-Tpf in an order. A drive for the sorter Sort is able to transport a holding apparatus with a mail item via the supply transportation path Z-Tpf, a previously selected connecting transportation path V-Tpf.i (i=1, 2, . . . ) and via the leadaway transportation path W-Tpf.

The sorter Sort has a plurality of storage areas S(1), S(2), . . . . Each storage area S(1), S(2), . . . has an associated set of recipient identifiers. In one embodiment, this association is produced in advance and assigns each storage area S(1), S(2), . . . a set of possible recipient identifiers. In another embodiment, the sorting installation SAnl produces the association automatically and step by step, specifically such that each association assigns only actually measured recipient identifiers to a storage area S(1), S(2), . . . . Each association is specified by a computer-accessible sorting plan which is stored in a data store and which the sorter Sort uses. In one embodiment, the connecting transportation paths V-TPf.1, V-Tpf.2, . . . act as storage areas S(1), S(2), . . . . In a second, preferred embodiment, each storage area S(1), S(2), . . . is formed by the section between two directly successive junctions Ein.i, Ein.i+1 in the leadaway transportation path W-Tpf.

In both embodiments, a holding apparatus with a mail item is brought forward in the supply transportation path Z-Tpf to the "correct" branch point Ab.k and, at this branch point, is directed into the branch connecting path V-Tpf.k. The correct branch point Ab.k is that which is connected by a connecting transportation path V-Tpf.k to that storage area which is associated with the recipient identifier on the mail item. In this case, the holding apparatus is transported past to the preceding storage areas S(1), . . . , S(k−1).

In the example from FIG. 6, there are two mail items in the supply transportation path Z-Tpf ahead of the junction EM.1, two mail items in the storage area S(1), one mail item in the storage area S(4) and three mail items in the storage area S(5).

The transportation of a holding apparatus with a mail item to the associated storage area S(k) is performed repeatedly until all holding apparatuses with mail items have been distributed over the storage areas S(1), S(2), . . . . In this case, it may arise that a storage area S(k) is full and a further holding apparatus with a mail item needs to be put into this already full storage area S(k). Preferably, the leadaway transportation path W-Tpf therefore contains at least one reserve storage area which is arranged downstream of the storage areas. In the example in FIG. 6, the storage area S(6) is provided as a reserve storage area. As soon as a storage area S(k) is full, the holding apparatuses in the full storage area and all holding apparatuses in downstream storage areas S(k+1), S(k+2), . . . are shifted downstream and brought forward, so that the previously empty reserve storage area S(6) receives holding apparatuses with mail items. The additional holding apparatus is transported into that storage area S(k) which was previously completely full and has been emptied by virtue of the bringing forward. The association between recipient identifiers and storage areas is modified.

Figure 7:
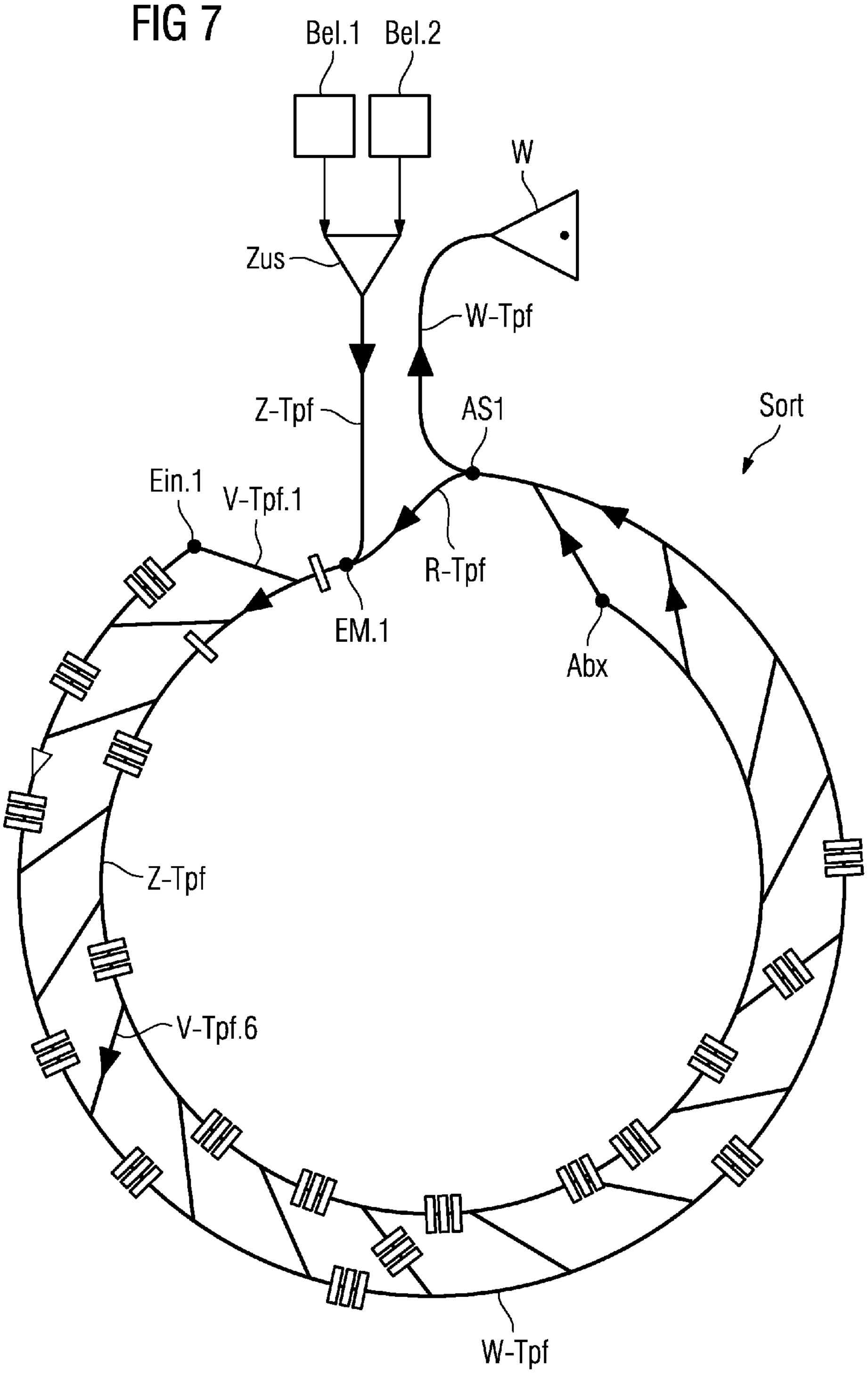
FIG. 7 is an illustration showing a modified exemplary sorter.

FIG. 7 shows another embodiment of the sorter from FIG. 6. The supply transportation path Z-Tpf and the leadaway transportation path W-Tpf transport mail items along a respective approximately circular conveyor track, the conveyor track for the supply transportation path Z-Tpf being situated within the conveyor track for the leadaway transportation path W-Tpf. The return transportation path R-Tpf is of very short design. The design shown in FIG. 7 allows many connecting transportation paths V-Tpf.1, V-Tpf.2, . . . to be implemented given a low space requirement for the sorter.

Usually, there are significantly more recipient identifiers than storage areas. Therefore, several sorting passes are performed. The return transportation path R-Tpf is routed from the leadaway transportation path W-Tpf back to the supply transportation path Z-Tpf. The return transportation path branches off from the leadaway transportation path W-Tpf at the branch point AS1 and joins the supply transportation path Z-Tpf at the junction EM1. Following the first sorting pass, the holding apparatuses with mail items are transported from the storage areas via the return transportation path R-Tpf to the supply transportation path Z-Tpf. In this case, the order among the holding apparatuses with mail items which have been produced in the first sorting pass is maintained. A second sorting pass is performed. In the second sorting pass, a second sorting plan is used which stipulates different associations between recipient identifiers and storage areas S(1), S(2), . . . than the first sorting plan. It is also possible to perform a third sorting pass.

The invention claimed is:

1. A method for handling a plurality of articles using an apparatus, the apparatus including a sorting installation, at least one temporary store, and at least one handling position, the at least one temporary store having a storage device with a closed conveyor track, feeder stations and at least one outward transfer station, wherein a sorting feature is prescribed for each article to be handled, which comprises the steps of:

passing the article through the sorting installation, wherein, while the article is passing through the sorting installation, the sorting installation measuring the value that the sorting feature prescribed assumes for the article;

storing the article temporarily in the temporary store;

removing the article from the temporary store and transporting the article to the handling position;

handling the article at the handling position, wherein for each article to be temporarily stored in the temporary store, the method further performs the steps of:

transporting the article to one of the feeder stations for the temporary store, the feeder station feeding the article into the temporary store;

transporting the article in the temporary store along the closed conveyor track of the temporary store and during transportation on the conveyor track the article is transported at least once to the outward transfer station of the temporary store, wherein every time the article to be handled is in the temporary store and is transported on the closed conveyor track to the outward transfer station of the temporary store, performing the further steps of:

continuing a transport of the article in the temporary store on the closed conveyor track and, during transportation, the article is transported past the outward transfer station or the article is transferred out of the temporary store by the outward transfer station and is transported to the handling position;

sorting articles in the sorting installation using measured sorting feature values such that, as a result of the sorting for the feeder station for the at least one temporary store, a respective sorting order is produced among the articles before the articles reach the feeder station, wherein in the sorting order all the articles for which the sorting feature assumes a same value are disposed in direct succession;

splitting the articles to be handled to a plurality of feeder stations;

transporting the articles included by the respective sorting order for the feeder station to the feeder station, each of the feeder stations feeding each article transported to the feeder station into the at least one temporary store of the apparatus such that at any time all the articles in the at least one temporary store are disposed in a respective storage order such that in the storage order all the articles for which the sorting feature assumes the same value are disposed in direct succession.

2. The method according to claim 1, wherein the at least one temporary store transports the articles in a same transportation direction on the closed conveyor track.

3. The method according to claim 1, wherein for the at least one outward transfer station for the at least one temporary store, the step of transferring articles out of the temporary store using the outward transfer station of the temporary store and of transporting them to the handling position, further comprises the steps of:

transporting each of the articles transferred-out from the outward transfer station to a buffer and putting them into the buffer, wherein the articles are put into the buffer such that a buffer order is produced among the articles in the buffer, and in the buffer order all the articles in the buffer for which the sorting feature assumes a same value are disposed in direct succession; and subsequently removing the articles from the buffer and transporting them to the handling position.

4. The method according to claim 3, wherein:

a plurality of handling positions are used;

at least two handling positions are connected to the buffer; and each article removed from the buffer is optionally transported to one or the other handling position.

5. The method according to claim 1, wherein the apparatus further contains a first temporary store, a second temporary store, and a physical attribute, a subrange from a value range for the physical attribute are prescribed, for each of the articles performing the further steps of:

performing a measurement to ascertain what value the physical attribute assumes for the article; and feeding the article into the first temporary store if a measured attribute value falls into a prescribed subrange, otherwise feeding the article into the second temporary store.

6. The method according to claim 1, which further comprises:

using one respective holding apparatus per article, each of the articles being connected to the holding apparatus before the article reaches the feeder station for the temporary store; and separating each of the articles from the holding apparatus after the outward transfer station for the temporary store has transferred the article out of the temporary store.

7. The method according to claim 1, which further comprises:

during the transportation of the article on the closed conveyor track to the outward transfer station for the temporary store, performing a check to determine whether there is an outward transfer signal for the article; and if there is the outward transfer signal, transferring the article out of the temporary store by means of the outward transfer station or a downstream outward transfer station for the temporary store.

8. The method according to claim 1, which further comprises:

prescribing an order among possible values of the sorting feature; and producing, via the sorting installation, the sorting order among the articles on a basis of a prescribed sorting feature value order at any time the respective storage order among the articles in the temporary store corresponds to the prescribed sorting feature value order.

9. The method according to claim 1, which further comprises:

producing, via the sorting installation, following every measurement of the sorting feature value, a value order among the sorting feature values which the sorting installation has measured in total in a previous course of the sorting;

producing, via the sorting installation, the sorting order among the articles to be sorted on a basis of a produced sorting feature value order; and feeding the articles into the temporary store such that the storage order among the articles in the temporary store corresponds at any time to the produced sorting feature value order.

10. The method according to claim 1, wherein the apparatus further includes a first temporary store and a second temporary store, and performing the further steps of:

feeding an article into the first temporary store if the sorting feature value is in a prescribed subrange from the value range of the sorting feature, otherwise transferring the article into the second temporary store.

11. An apparatus for handling a plurality of articles, the apparatus comprising:

a sorting installation having a measuring instrument configured to measure, for each article to be handled, what value a prescribed sorting feature assumes for the article, said sorting installation configured to use measured sorting feature values to produce a sorting order among the plurality of articles to be handled;

at least one temporary store having a storage device with a closed conveyor track, at least one feeder station and at least one outward transfer station, said temporary store configured to temporarily store the plurality of articles to be handled and to transport them along said closed conveyor track, said feeder station for said temporary store configured to feed the article into said temporary store, said outward transfer station of said temporary store configured to transfer the article which is in said temporary store out of said temporary store;

at least one handling position configured to handle the article at said handling position;

the apparatus configured, for each of the articles to be handled, to:

pass the article through said sorting installation;

measure, via said measuring instrument, what value the prescribed sorting feature assumes for the article;

store temporarily the article in said temporary store;

remove the article from said temporary store and transported the article to said handling position and the article is handled at said handling position;

wherein the apparatus is further configured to perform, for each article to be handled, during temporary storage of the article in the temporary store, the following:

transporting the article to said feeder station for said temporary store;

feeding the article into said temporary store using said feeder station;

transporting the article in said temporary store along said closed conveyor track, wherein during transportation on said closed conveyor track, the article is transported at least once to said outward transfer station for said temporary store;

wherein the apparatus is further configured to perform, every time the article to be handled which is in said temporary store for the apparatus is transported on said closed conveyor track to said outward transfer station for said temporary store, one of the two steps of:

leaving the article in said temporary store and continuing to transport the article on said closed conveyor track and, during the transportation, transporting the past said outward transfer station; or transferring the article out of said temporary store using said outward transfer station and transporting the article to said handling position;

wherein the apparatus is further configured to:

prompt said sorting installation to sort the articles to be handled using the measured sorting feature values such that the sorting produces, for said feeder station for said temporary store, a respective sorting order among the articles before the articles reach said feeder station, wherein in the sorting order all the articles for which the sorting feature assumes a same value are disposed in direct succession;

transport the articles included by the respective sorting order for said feeder station to said feeder station;

feed each of the articles transported to said feeder station into said temporary store using said feeder station such that at any time all the articles in said temporary store are disposed in a respective storage order such that in the storage order all the articles for which the sorting feature assumes the same value are disposed in direct succession; and split the articles to be handled over a plurality of feeder stations when there are said plurality of feeder stations.

* * * * *